(12) United States Patent
Cohen et al.

(10) Patent No.: US 6,782,541 B1
(45) Date of Patent: Aug. 24, 2004

(54) SYSTEM AND METHOD OF EXCHANGING INFORMATION BETWEEN SOFTWARE MODULES

(75) Inventors: Marc A. Cohen, Powell, OH (US); John David Long, Worthington, OH (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/322,362

(22) Filed: May 28, 1999

(51) Int. Cl.[7] .............................. G06F 9/44; G06F 9/46

(52) U.S. Cl. ...................................... 719/318; 719/315

(58) Field of Search ................................ 719/318, 315, 719/316

(56) References Cited

U.S. PATENT DOCUMENTS

| | | | |
|---|---|---|---|
| 5,315,703 A | * 5/1994 | Matheny et al. | ............ 345/700 |
| 5,485,617 A | * 1/1996 | Stutz et al. | .................. 709/315 |
| 5,517,655 A | * 5/1996 | Collins et al. | ............. 345/736 |
| 5,721,825 A | * 2/1998 | Lawson et al. | ............. 709/203 |
| 5,734,810 A | 3/1998 | Tanaka et al. | |
| 5,872,973 A | 2/1999 | Mitchell et al. | |
| 5,884,317 A | 3/1999 | Cline et al. | |
| 5,889,954 A | 3/1999 | Gessel et al. | |
| 5,893,118 A | 4/1999 | Sonderegger | |
| 5,920,692 A | * 7/1999 | Nguyen et al. | ............. 709/204 |
| 5,925,108 A | * 7/1999 | Johnson et al. | ............. 719/318 |
| 5,991,536 A | * 11/1999 | Brodsky et al. | ............ 717/104 |
| 6,275,957 B1 | * 8/2001 | Novik et al. | .................. 714/39 |
| 6,363,435 B1 | * 3/2002 | Fernando et al. | ........... 709/318 |
| 6,367,034 B1 | * 4/2002 | Novik et al. | .................. 714/39 |
| 6,424,354 B1 | * 7/2002 | Matheny et al. | ............ 345/619 |
| 6,658,487 B1 | * 12/2003 | Smith | ......................... 719/318 |

OTHER PUBLICATIONS

SIGS Publications. "Event Notifier, a Pattern for Event Notification." Java Report. Jul. 1998.*
IBM Technical Disclosure Bulletin. "Improved Event Listener Registration Interface." Jan. 1, 1998.*
Gamma, Erich et al. "Design Patterns, Elements of Reusable Object Oriented Software." 1995.*
Bates, John et al. "Using Events for the Scalable Federation of Heterogenous Components." ACM. 1998.*

* cited by examiner

Primary Examiner—Lewis A. Bullock, Jr.

(57) ABSTRACT

A system includes a brokering arrangement for exchanging information between software modules including notifiers which detect triggering events having corresponding event classes and observers interested in receiving notification of the happenings of the triggering events. The system includes a broker, observers, and notifiers. The software modules are created in discrete addressable locations of a single computer's memory or the memories of multiple computers interconnected through a network. The broker maintains one or more look-up tables having the identities and memory or network locations of all notifier and observer software modules existing in the system, as well as the classes of events with which the modules are concerned. Upon creation of a new notifier or subscription to the broker by an observer module, the broker adds the newly-created module to the one or more look-up tables, which the broker then scans to match notifiers and observers having common event classes. If the broker determines that a notifier and observer share an event class, the broker instructs the notifier to send notification of the happening of the triggering event directly to the observer. The broker, then assists notifiers and observers in establishing direct callback interfaces, but is not involved in later communications between the notifiers and observers after the callback interfaces are established. As new modules are created, and as old modules are removed and/or re-created, the look-up tables are updated and the observers are notified accordingly, thereby permitting so-called "hot swapping" of software components.

25 Claims, 7 Drawing Sheets

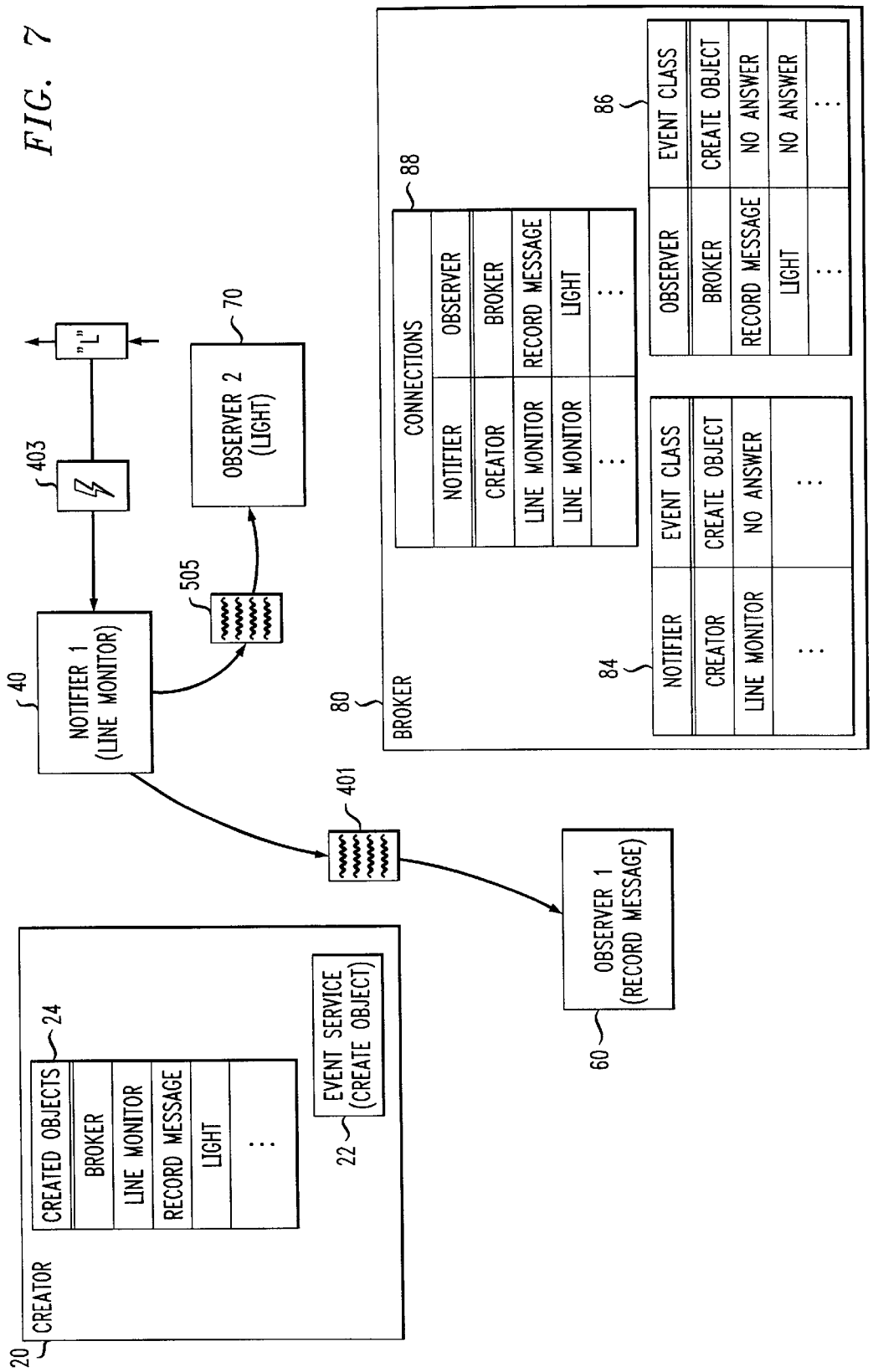

SYSTEM AND METHOD OF EXCHANGING INFORMATION BETWEEN SOFTWARE MODULES

BACKGROUND OF THE INVENTION

1. Technical Field of the Invention

The present invention relates to systems for, and methods of, exchanging information between software modules. More particularly, the present invention relates to systems for, and methods, of exchanging information between software modules, wherein a brokering service is provided to manage callback interfaces between notifiers and observers.

2. Description of the Related Art

Object-oriented computer programming ("OOP") deconstructs a high-level operation performed by a computer application into discrete modules known in the art as "objects" or "components." Prior to OOP, computer applications typically contained program code for each task which may be executed during the application's high-level operation. However, OOP allows a computer application to contain only the program code which is minimally necessary for the operative structure or framework of the application's high-level operation. Each specific task to be performed during the computer application's high-level operation, then, is provided as a component which is itself "called" into the framework of the computer application on an as-needed basis. Component-based programming platforms known to those of ordinary skill in the art, such as Component Object Model ("COM"), distributed by Microsoft Corporation of Seattle, Wash., or Common Object Request Broker Architecture ("CORBA"), promulgated by Object Management Group of Framingham, Mass., were developed for the purpose of designing modular computer applications.

Generally, objects may be considered to be either "observers" or "notifiers" or both which commonly reside within discrete addressable locations of a computer's memory. An observer is responsible for performing some predefined operation in response to detection by a notifier of a predetermined triggering event. For example, in a telecommunications network, the observer may be an automated voicemail application which is responsible for playing a prerecorded message and recording an incoming message when an incoming telephone call is routed to voicemail. The notifier may be connected to a telephone line to detect an incoming call which is reported to the observer thus triggering the voicemail application. It is therefore desirable to provide a system for, and method of, transmitting a message from a notifier component to an observer component upon the happening of a predetermined triggering event.

One known method for an observer to be advised of the happening of a triggering event involves having the observer periodically poll the notifier to determine the status of the notifier. For example, the notifier may contain a memory flag which is in a logical "up" position when it detects an incoming call on the line and which is in a logical "down" position at all other times. Upon polling the notifier, if the observer detects that the flag is in the "up" position, it thereby detects the happening of the triggering event and initiates the automated voicemail application. According to this method, however, the observer must poll the notifier at frequent, predetermined intervals to determine the position of the flag. Such repeated polling consumes substantial operating time and can create operating problems, for example, when the notifier is removed from the system. Moreover, polling the notifier is a totally useless operation most of the time since the status of the flag does not change frequently. Thus, polling reduces overall system performance and efficiency. Accordingly, it is desirable to provide a system for, and method of, exchanging information between software modules, wherein unnecessary polling or querying of a notifier by an observer is minimized or altogether eliminated.

Another known method of notifying an observer of the happening of a triggering event is for the notifier to spontaneously transmit a message to the observer when a triggering event occurs. For example, an object-based platform, such as COM, can establish a "callback interface" between the observer and the notifier, whereby the observer has beforehand registered with the notifier the observer's interest in being notified upon the happening of a triggering event. Typically, the observer initiates the procedure of establishing the callback interface by locating the notifier, querying the notifier to determine whether the notifier is adapted to detect the happening of the triggering event which is of interest to the observer, and if so, determining if the notifier is adapted to advise the observer of the happening of the triggering event. If so, the observer registers with the notifier the observer's interest in being notified when the triggering event occurs.

Unfortunately, the process by which the callback interface is established according to known methods requires several queries and messages to be exchanged between the observer and the notifier. Moreover, an observer may not know whether, or where, a notifier resides on the server which may detect triggering events of interest to the observer. As such, an observer may operate completely ignorant of the fact that it could take advantage of the notification services of a notifier existing in the system, but fails to do so only because it is unaware of the notifier's existence. To find notifiers offering notification services of interest to the observer with which the observer desires to establish a callback interface, then, requires the observer to search the entire system looking for notifiers which monitor events of interest to the observer and to contact all notifiers in the process, many of which may not monitor events of interest to the observer. It is obvious that the search for and querying of each notifier found on the system significantly reduces overall system performance and efficiency. It is therefore desirable to provide a system for, and method of, establishing a callback interface between an observer and a notifier, wherein minimal searching and querying is required for observers to establish callback interfaces with notifiers.

To this end, a directory service is sometimes provided on a system with a look-up table containing the locations of any notifiers on the system and the class of events the notifiers respectively monitor. For example, as each notifier is created, an entry is created in the directory service look-up table for that notifier having the location of the notifier and the class of events it monitors. Rather than searching the system at large for a notifier which monitors a particular class of events, an observer, when it becomes interested in receiving notification from a notifier, consults the directory service look-up table to find those notifiers registered therein which monitor a class of events of interest to the observer. For example, upon its creation the line-monitoring notifier of the above example would register its location alongside a reference to its monitoring the unanswered status of a telephone line. The voicemail observer, then, upon consulting the directory service, would determine that the line-monitoring notifier monitors an event class of interest to it and would directly initiate a callback relationship with the line-monitoring notifier. Because the directory service points the observer directly to the notifier, the observer is not required to search the system for it, thereby improving overall system performance and efficiency. However, it is not always desirable for an observer to be pointed directly to a notifier. For example, disclosing the location of the notifier to other objects, such as the observer, may present security issues. Moreover, while a directory service reduces the searching and querying required for observers to establish callback interfaces with notifiers, observers need to poll the service to determine whether new notifiers have been created.

An event service is sometimes provided as an alternative to a directory service, whereby messaging is routed through the event service such that, as notifiers and observers are created in and removed from the system, notifiers do not transmit messages to observers which have been removed, but have failed to instruct their notifiers accordingly. Moreover, using an event service, observers need not poll the system to find desirable notifiers. Rather, an event service receives all notification messages from all notifiers in the system and forwards the messages to observers which have registered an interest in receiving messages having a preselected event class. Unfortunately, event services oftentimes create a bottleneck in the system, thereby decreasing overall system performance and efficiency. System performance is particularly reduced by using an event service where the data passing through the event service is especially dense, such as, for example, streaming audio or video. Further, all of the existing arrangements lack a viable interface recovery procedure when components are removed from service and restored.

Accordingly, there is a need in the art for a system and method for exchanging information between software modules wherein the messages are passed directly between the modules without the heretofore actions required on the part of the components and the potentially restrictive form of directory services or event services.

SUMMARY OF THE INVENTION

This need is met by the invention of the present application wherein a system includes a brokering arrangement for exchanging information between software modules including notifiers adapted to detect the happening of predetermined triggering events having corresponding event classes and observers interested in receiving notification of the happenings of the triggering events. The system includes a broker, observers, and notifiers. In the illustrated embodiment, a creator creates the broker, the observers and the notifiers with the creator creating the software modules in discrete addressable locations of its computer's memory or the memories of multiple computers interconnected through a network. The broker maintains one or more look-up tables having the identities and locations of all notifier and observer modules existing in the system, as well as the classes of events with which the modules are concerned.

Upon creation of a new notifier or observer module, the creator informs the broker that a newly-created module has been created in the system, and points the broker to the new module's location. Once connected to the new module, the broker queries the module to determine if it offers notification services, i.e., if it is a notifier. If not, the broker takes no further action with respect to the newly-created module. If the broker determines that the newly-created module offers notification services, the broker adds the notifier to a first or notifiers look-up table, along with the notifier's event class.

An observer existing in the system, whether or not the observer was created by the creator, finds the broker for the purpose of subscribing to a notification service which is offered by one or more notifiers in the system to advise of an event class or classes of interest to the observer. Once the observer subscribes to any such notification service via the broker, the broker adds the observer to a second or observers look-up table, along with the observer's event class.

Whenever a notifier or observer has been added to the broker's look-up tables, the broker compares the notifiers look-up table with the observers look-up table to determine if any notifiers and observers share an event class. In the event the broker determines that a notifier and observer share an event class, the broker sends a message to the notifier, instructing the notifier to send notification of the occurrence of the triggering event directly to the observer. The broker thereby assists in establishing a callback interfaces between notifiers and observers, but is not involved in later communications between the notifiers and observers after the callback interfaces have been established. As new modules are created, and as old modules are removed and/or re-created, the look-up tables are updated so that connection interfaces are created and/or recreated without any action on the part of the observers and notifiers, thereby permitting so-called "hot swapping" of software modules and automatic recovery of callback interfaces.

In accordance with one aspect of the present invention, a system for exchanging information between software modules comprises a broker which includes a first look-up table for registering modules, notifiers, which notify other modules of the occurrence of one or more triggering events having corresponding event classes and a second look-up table for registering modules, observers, which are to receive notification of one or more triggering events having corresponding event classes. A first notifier is adapted to detect the occurrence of a first predetermined triggering event having a first event class and a first observer is interested in receiving notification of the occurrence of predetermined triggering events having a second event class. The broker adds the first notifier to the first look-up table when the first notifier is created and the broker adds the first observer to the second look-up table when the first observer notifies the broker that it is interested in receiving notification of the predetermined triggering event, i.e., subscribes to the broker's services. The broker is adapted to compare the first look-up table with the second look-up table such that, upon the broker's detecting that the first event class and the second event class are the same, the broker instructs the first notifier to notify the first observer directly of the occurrence of the first predetermined triggering event.

In accordance with another aspect of the present invention, a method for exchanging information between software modules comprises the steps of: creating a broker including a first look-up table and a second look-up table; creating a first notifier adapted to detect the occurrence of a first predetermined triggering event having a first event class; the broker listing the first notifier with the first event class in the first look-up table; creating a first observer interested in receiving notification of the occurrence of predetermined triggering events having a second event class; the broker listing the first observer with the second event class in the second look-up table when the first observer notifies the broker that it is interested in being notified of the occurrence of the predetermined triggering event; the broker comparing the first look-up table with the second look-up table; and, the broker instructing the first notifier to notify the first observer directly of the occurrence of the first predetermined triggering event if the first event class and second event class are the same.

It is a feature of the present invention to provide a system and method for exchanging information between software modules. More particularly, it is a feature of the present invention to provide a system and method for brokering communications between notifier modules and observer modules.

It is another feature of the present invention to provide a system and method for exchanging information between software modules wherein unnecessary polling or querying of a notifier by an observer is eliminated.

It is yet another feature of the present invention to provide a system and method for establishing callback interfaces between observer modules and notifier modules wherein searching on the part of observers is not required for observers to establish callback interfaces with notifiers.

It is still another feature of the present invention to provide a system and method for exchanging information between software modules wherein messages are passed directly between the modules.

It is still yet another feature of the present invention to provide a system and method of exchanging information between software modules which is robust and eases the implementation of callback interfaces between notifiers and observers.

It is an additional feature of the present invention to provide a system and method of exchanging information between software modules wherein the recoverability of connections between notifiers and observers is robust in that when new notifier modules are created or when existing modules are removed from service and recreated, the callback interfaces are automatically created, recreated or recovered by the broker.

These and other features and advantages of the present invention will become apparent to those skilled in the art from the description which follows, and may be realized by means of the instrumentalities and combinations particularly pointed out in the claims appended hereto.

BRIEF DESCRIPTION OF THE DRAWINGS

A better understanding of the present invention will be had upon reference to the following description in conjunction with the accompanying drawings in which like reference numerals represent like parts, and wherein:

FIG. 7 is a diagrammatic view of the system for exchanging information between software components of FIG. 1, showing a further step of notifying the observer and the additional observer.

DETAILED DESCRIPTION OF THE INVENTION

Figure 1:
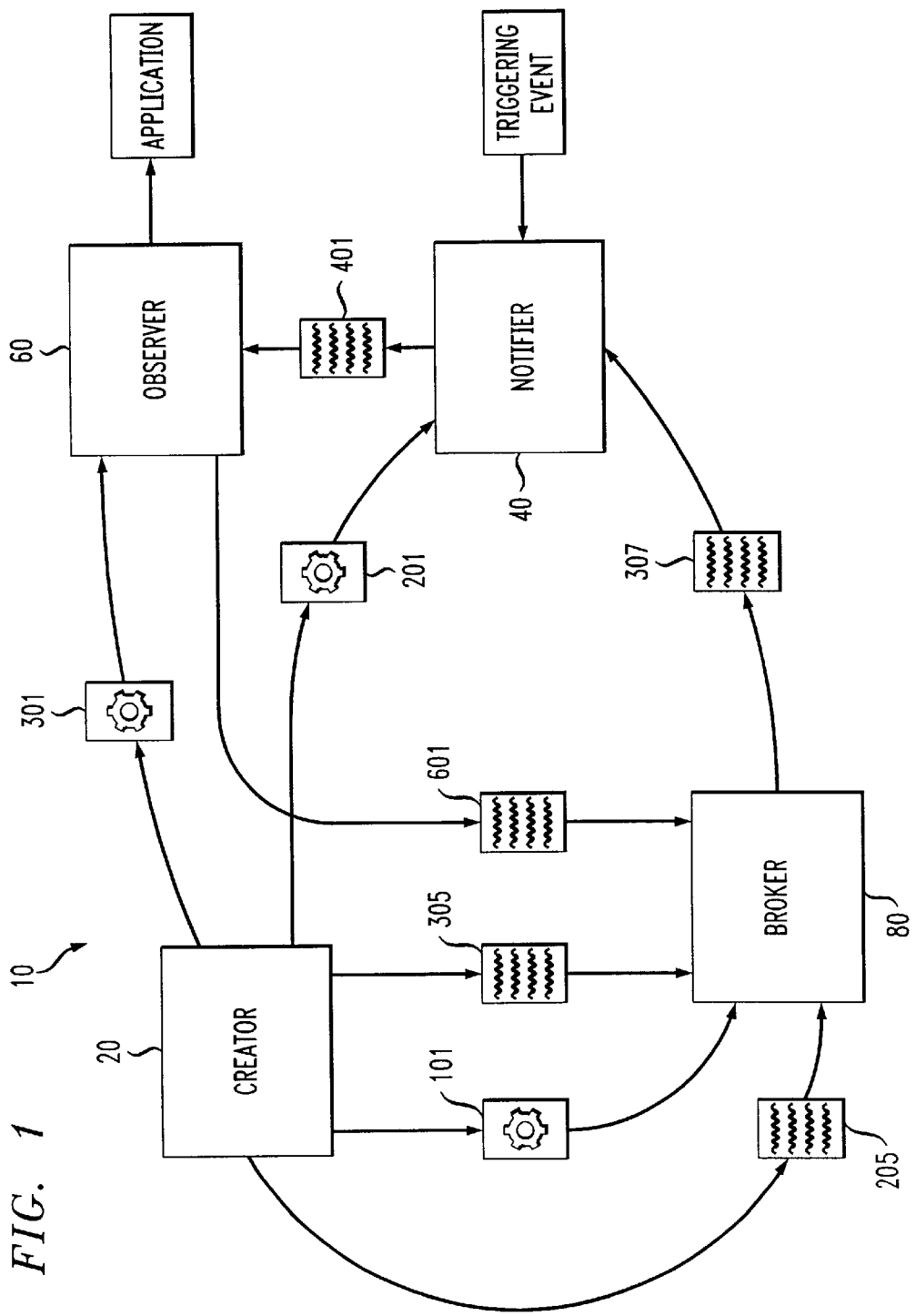
FIG. 1 is a diagrammatic view of the system for exchanging information between software components according to a preferred embodiment of the present invention.

Reference will now be made to the figures wherein FIG. 1 illustrates a system 10 for exchanging information between software modules, objects, components or the like, according to the invention of the present application. The illustrative embodiment of the system 10 includes a creator 20, a broker 80, at least one notifier 40 and at least one observer 60. Although the system 10 of the illustrative embodiment will be described as having one notifier 40 and one observer 60, it will be obvious to those of ordinary skill in the art from this description, that any number of notifiers and observers may be provided without departing from either the spirit or the scope of the present invention.

The noted software components, i.e., the creator 20, the notifier 40, the observer 60, and the broker 80, are illustrated as being self-contained modules. Each module may reside in a separate virtual address space or all modules may share a common virtual address space, or modules may be deployed in any combination thereof. Further, each module may reside on a separate physical computer or all modules may reside on the same computer, or modules may be deployed in any combination thereof. Depending on how the modules are distributed, a given module may access another module by direct memory addressing (for the case where the called module resides in the same virtual address space as the calling module), by interprocess communication (for the case where the called module resides on the same computer as the calling module but in a separate virtual address space), or by remote procedure call (for the case where the called module resides on a separate computer from the calling module). Although not required by the invention, use of a distributed object-based programming platform to provide module access, such as Distributed Component Object Model ("DCOM"), developed and distributed by Microsoft Corporation of Seattle, Wash., or Common Object Request Broker Architecture ("CORBA"), promulgated by Object Management Group of Framingham, Mass., provides significant utility because it enables the calling module to access the called module without knowing its location and without distinguishing between the three modes of access (direct memory addressing, interprocess communication, and remote procedure call).

The creator 20 is a software component adapted to create other objects, such as the broker 80, the notifier 40 and the observer 60, and as such, is preferably inherent in the system 10, such as by a software application which has been installed on the operating system to perform some predefined high-level operation. Because the creator 20 is responsible for creating the broker 80, the notifier 40 and the observer 60 in the illustrated embodiment, the creator 20 must be present in the system 10 before the broker 80, the notifier 40 and the observer 60 may be created. However, the notifier 40 as well as other notifiers of the system 10 and the observer 60 as well as other observers of the system 10 need not be created by creator 20, but may be created by other components of the system 10 adapted to create such components as described herein.

Generally, the system 10 according to the illustrated embodiment is constructed by the creator 20 creating the broker 80 in an addressable location within the computer's memory as illustrated by the block 101. Because the creator 20 creates the broker 80, the creator 20 knows and makes note of the broker's 80 location, thereby permitting the creator 20 to later address the broker 80 directly, for example, to send messages and instructions thereto. The creator 20 then creates the notifier 40, as illustrated by block 201, in another location and sends a message 205 to the broker 80, informing the broker 80 that an object has been created and pointing the broker 80 directly to the location of the newly-created notifier 40, thereby permitting the broker 80 to address the notifier 40 directly. The notifier 40 also contains an event class relating to the types of information which will be monitored by the notifier 40, the occurrence of which will be provided to any components of the system 10 which are interested in that event class and have subscribed with the broker as will be described. For example, the notifier 40 may monitor the occurrence of one or more events, may perform an operation which is required by interested components or may otherwise provide needed information.

The creator 20 then creates the observer 60, as illustrated by block 301, in another location. The creator 20 then sends a message 305 to the broker 80, informing the broker 80 that another object has been created and pointing the broker 80 to the location of the newly-created observer 60, thereby permitting the broker 80 to address the observer 60 directly.

As objects are created in the system 10, the broker 80 is informed of their creation and the broker 80 queries each object to determine if it provides notification services of any event class, i.e., to determine if the created object is a notifier. If the broker 80 determines that a newly-created object is a notifier, the broker 20 further queries the notifier 40 to determined any event classes contained therein, which the broker 80 adds to a notifiers look-up table 84 of FIG. 2, along with the identity of the notifier 40.

If the broker 80 determines that the newly-created object does not provide notification services, such as where the newly-created object is an observer, the broker 80 takes no further action with respect to the newly created object. Thus, observers may be created in the system 10 without the broker 80 knowing of their existence, other than to have been advised that a non-notifier object was created. The broker remains oblivious to observers, such as the observer 60, until such time as the observers contact the broker 80 for the purpose of subscribing to a notification service, which is offered by one or more notifiers in the system 10. The observer 60 subscribes to a notification service by sending a message 601 to the broker 80, requesting that the broker 80 add the observer 60 to an observers look-up table 86 of FIG. 2, along with the event class of the triggering event the occurrence of which the observer 60 desires to be notified. When an observer, such as the observer 60, has subscribed to a notification service, the broker 80, knowing the location of the observer, sends a message 307 to any notifiers having the same event class or classes, such as the notifier 40, instructing the notifier 40 to direct any notification of the occurrence of the triggering event directly to the observer 60. Once the notifier 40 detects the occurrence of the triggering event, the notifier 40 sends a message 401 directly to the observer 60.

Figure 2:
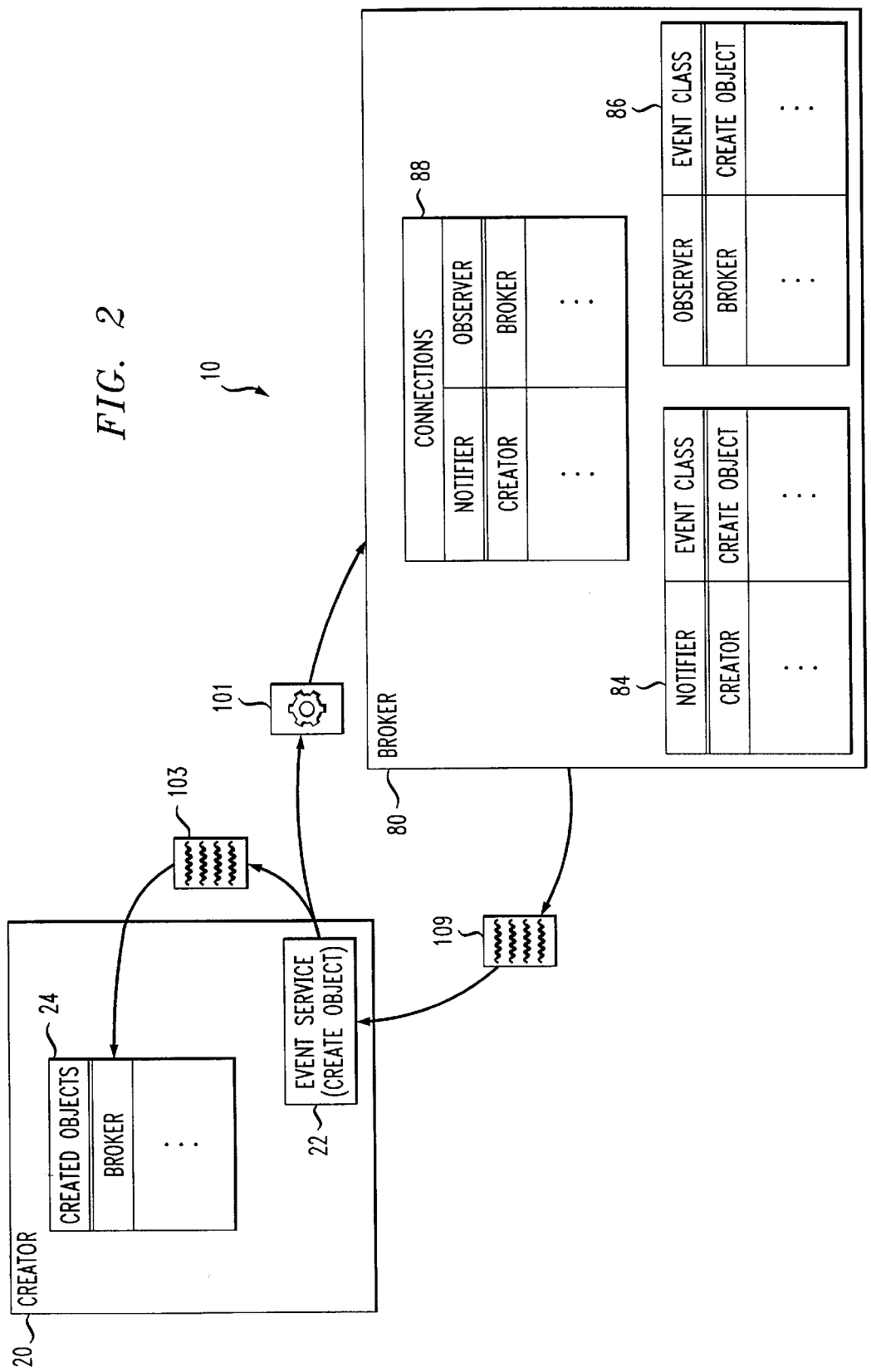
FIG. 2 is a diagrammatic view of the system for exchanging information between software components of FIG. 1, showing a first step of creating a broker.

With additional reference to FIG. 2, the system 10 according to the illustrated embodiment is described in greater detail and with reference to a computer application for controlling a telecommunications system, although it will be obvious to those skilled in the art that the system 10 described herein may be applied to any application and is not limited to computer applications for controlling telecommunications systems. As stated above, the creator 20 is an addressable object inherent in the system 10 and is adapted to create instances of other addressable objects, components, modules or the like. The creator 20 contains one or more sub-processes of the creator 20 adapted to perform a particular predetermined operation, such as, for example, a creation service 22 for creating an object, such as the notifier 40 or the observer 60. The creation service also acts as an event service in that it notifies the broker 80 whenever an object is created. The creator 20 also includes a registry 24 listing all objects created by the creator 20 and the respective locations of the created objects.

Upon initialization, the creator 20 creates the broker 80 in an addressable location in the system 10, as illustrated by the block 101, and sends a message 103 to the registry 24, adding the broker 80 and the location of the broker 80 to the registry 24. As the broker 80 is being created, three look-up tables are defined therein: a notifiers look-up table 84, an observers look-up table 86 and a connections look-up table 88. The notifiers look-up table 84 lists any notifiers created in the system 10 and the class of events which the notifier will report. The observers look-up table 86 lists any observers created in the system 10 which have subscribed to one or more notification services offered by notifiers in the system 10 and the event classes of the triggering events which the observers are interested in having reported to them. The connections look-up table 88 lists all notifiers and observers listed in look-up tables 84, 86 which have the same event class or classes and the locations of the observers associated with the event class or classes, i.e., the connections which have been set-up or brokered by the broker 80.

Immediately after creation, the broker 80 queries the creator and determines that the creator is a notifier and that its event class is the creation of objects. The broker 80 then adds the creator 20 to the notifiers look-up table 84 and references an event class labeled "create object" therein associated with the creator 20. As such, the broker 80 considered the creator 20 to be a notifier which will create objects in the system 10 and which will provide notification thereof to any object interested in being notified of the creation of an object. The broker 80, then, adds itself, i.e. the broker 80, to the observers look-up table 86 and references an event class labeled "create object" therein. After adding itself to the observers look-up table 86, the broker 80 compares the notifiers look-up table 84 with the observers look-up table 86 to find any instance of a common event class. Finding the creator 20 and the broker 80 sharing an event class labeled "create object", the broker adds or brokers this connection to the connections look-up table 88 and sends a message 109 to the creator 20 instructing the creator 20 to notify the broker 80 directly when new objects are created. As such, the broker 80 has established a callback relationship between itself and the creator 20, whereby the broker 80 will be notified whenever the creator 20 creates a new object in the system 10.

Figure 3:
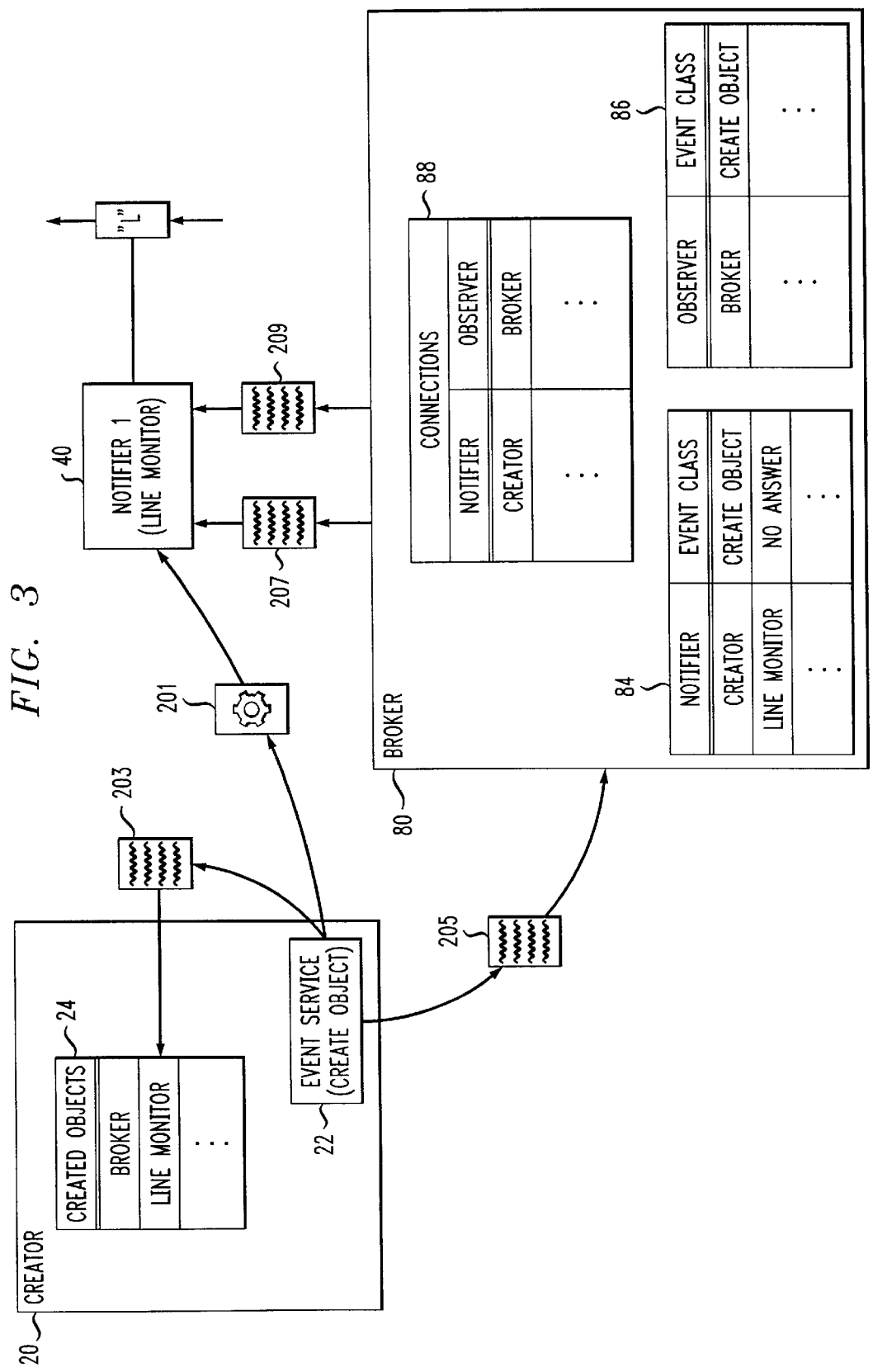
FIG. 3 is a diagrammatic view of the system for exchanging information between software components of FIG. 1, showing a second step of creating a notifier.

With reference to FIG. 3, the creator 20 creates the notifier 40, as illustrated by block 201, to detect and to provide notification of the occurrence of a predetermined triggering event. For example, the notifier 40 may be labeled a "Line Monitor" and be connected to a telephone line "L" to monitor the status of the line "L" so as to provide notification when an incoming call is present thereon. The line "L" may be such that an incoming call is presented to it only after being forwarded by conventional telephone switching operations from an unanswered user's phone line. Upon creation of the notifier 40, the creation service 22 sends a message 203 to the objects registry 24 to add the notifier 40 thereto and sends a message 205 to the broker 80, informing the broker 80 of the creation of a new object and pointing the broker 80 directly to the location of the newly-created notifier 40. The broker 80 sends a message 207 to the notifier 40 to determine if the notifier 40 offers notification services of any event class. Finding that it does, as in the present example, the broker 80 sends another message 209 to the notifier 40, requesting that the notifier 40 disclose its event class or classes to the broker 80. Upon learning the event class or classes of the notifier 40, the broker 80 lists the notifier's 40 event classes next to the notifier 40 in the notifiers look-up table 84. In the present example, the notifier 40 contains the "no answer" event class, which the broker 80 adds to the notifiers look-up table 84. The broker 80 then scans the observers look-up table 86 to determine if any observers previously created and listed therein includes a "no answer" event class. The broker 80 of the present example, finding no observers having a "no answer" event class, then awaits further communication from objects in the system 10.

Figure 4:
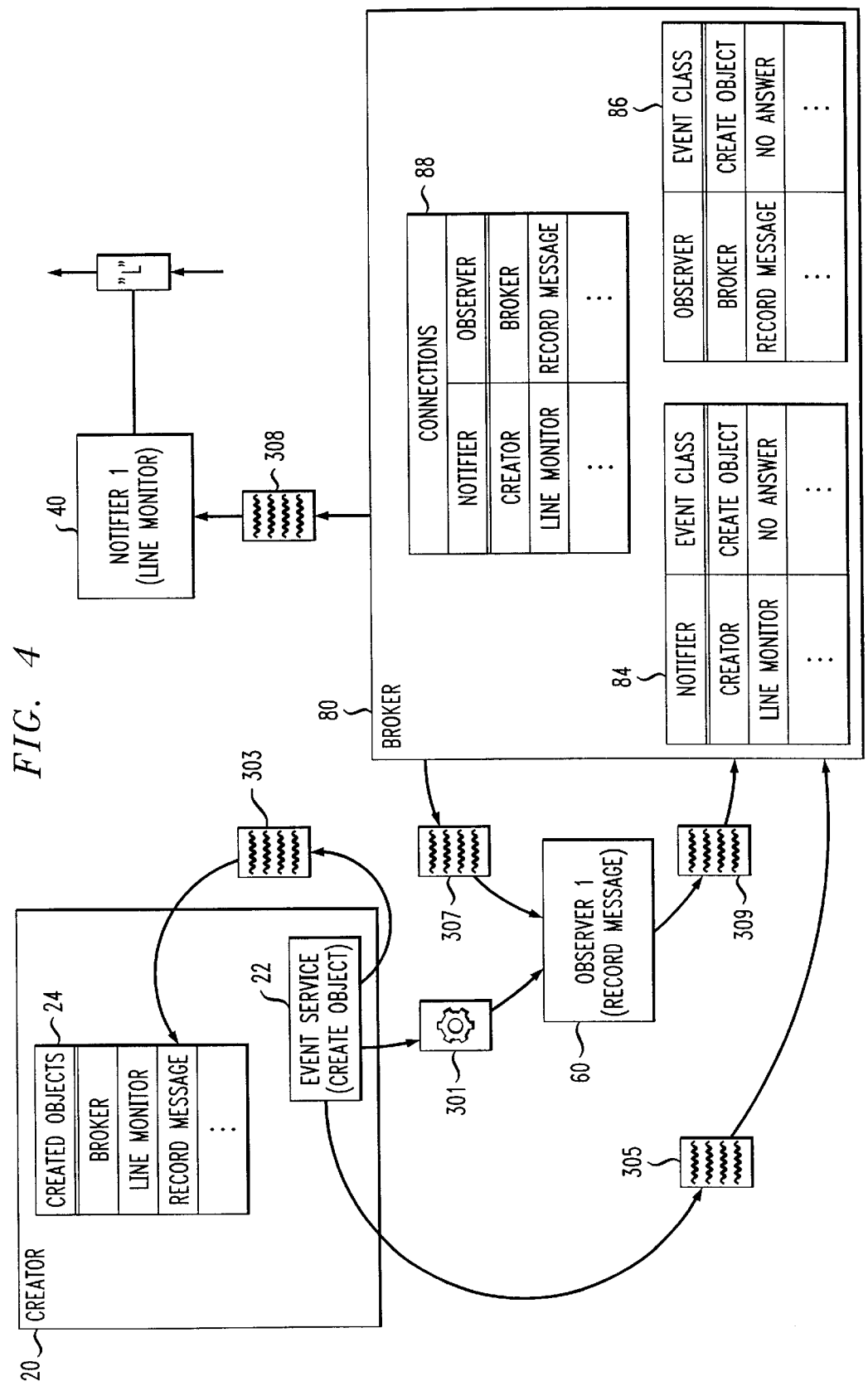
FIG. 4 is a diagrammatic view of the system for exchanging information between software components of FIG. 1, showing a further step of creating an observer.

With reference to FIG. 4, the creator 20 next creates the observer 60, as illustrated by block 301, which, for example, may be labeled "Record Message", and which is interested in being notified of the happening of a predetermined triggering event. For example, the observer 60 may be interested in being informed when an incoming call is present on the line "L" so that the observer 60 may initiate an automated voice mail answering application which is responsible for playing a prerecorded message and recording an incoming message when an incoming telephone call is routed to it.

Upon creation of the observer 60, the creation service 22 sends a message 303 to the objects registry 24 to add the observer 60 thereto and sends a message 305 to the broker 80, informing the broker 80 of the creation of a new object in the system 10 and pointing the broker 80 directly to the location of the newly-created observer 60. The broker 80 next sends a message 307 to the newly-created observer 60 to determine if the observer 60 offers notification services. Finding that it does not, the broker 80 takes no further action with respect to the newly-created observer 80, but instead awaits further communication from objects in the system 10. If the broker 80, upon inquiry, had determined that the newly-created observer 60 was, instead, a notifier and therefore provides notification services, the broker 80 would have proceeded as described above.

Direct connections between notifiers and observers which share event classes are negotiated by the broker 80, which knows of all notifiers residing in the system 10 and of their respective event classes. The broker 80 does not become aware of the observer 60 and its event class (or classes), and more importantly, does not add the observer 60 and its event class to the observers look-up table 86, until the observer contacts the broker 80 to subscribe to a notification service having a desired event class. Thus, observers must be adapted to locate and initiate communication with broker 80.

When the observer 60 becomes interested in receiving notification of the occurrence of a predetermined triggering event having a given event class, the observer 60 locates the broker 80 and sends a message 309 to the broker 80, subscribing to the notification service having the preselected event class. This is accomplished simply by the broker's 80 adding the observer 60 to the observers look-up table 86, along with the observer's 60 event class, which the observer 60 discloses to the broker 80 in a message 309.

Figure 5:
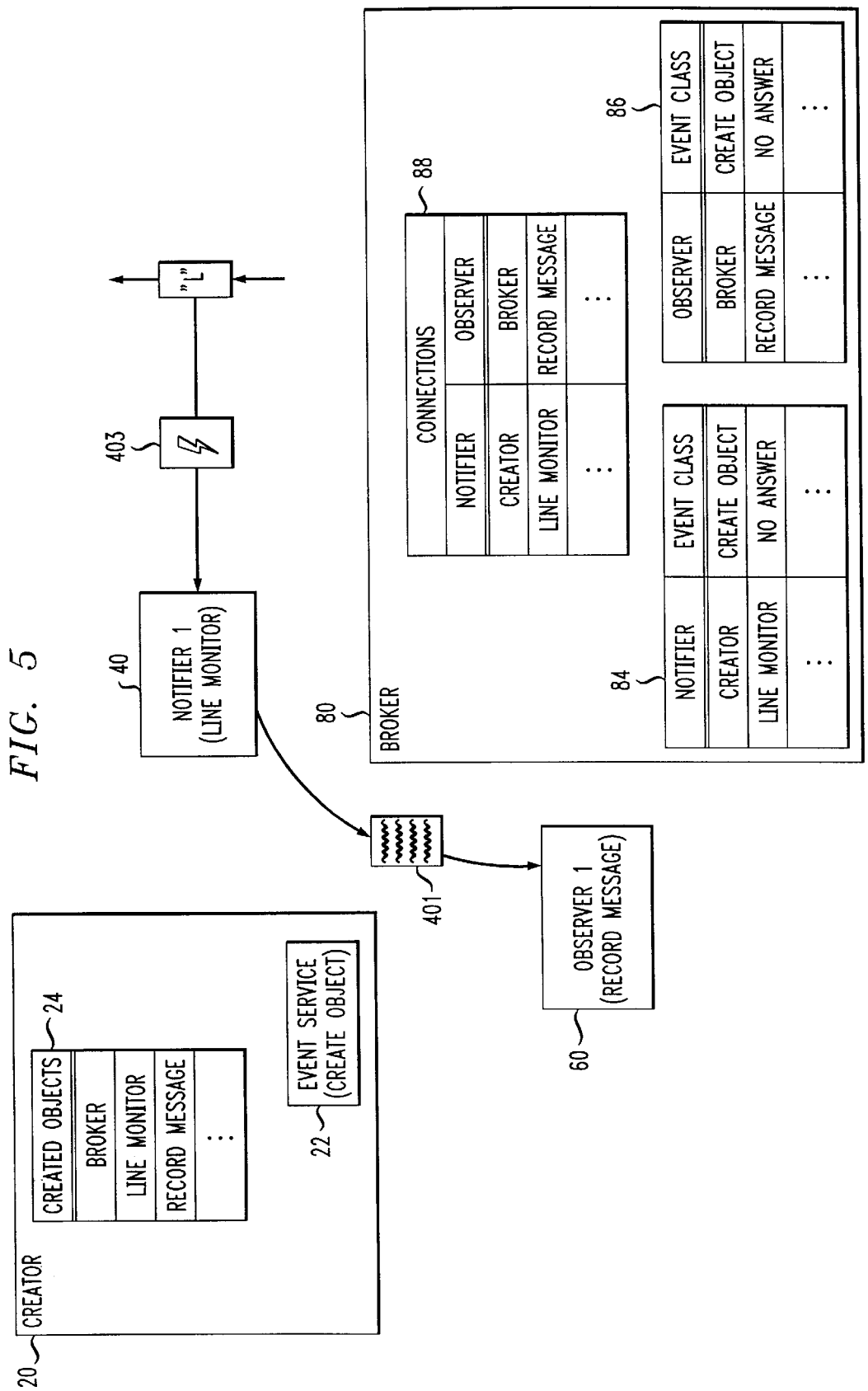
FIG. 5 is a diagrammatic view of the system for exchanging information between software components of FIG. 1, showing a further step of notifying the observer.

In the present example, observer 60 subscribes to a notification service offered by notifiers having a "no answer" event class. The broker 80 adds the observer 60 to the observers look-up table 86, along with a reference to the observer's "no answer" event class. The broker 80 then scans the notifiers look-up table 84 to determine if any notifiers previously created and listed therein include a matching "no answer" event class. Finding the notifier 40 listed therein having a "no answer" event class, the broker 80 adds the notifier 40-observer 60 connection to the connections look-up table 86 and records the observer's 60 location. The broker 80, knowing the notifier's 40 location, as disclosed to it by the creator 20, sends a message 308 to the notifier 40, instructing the notifier 40 to send notification of the occurrence of the triggering event directly to the observer 60 at the observer's known location. The broker 80 thereby establishes a direct callback relationship between the notifier 40 and the observer 60 without either component being required to search for the other. The broker 80 having thus established the callback relationship between the notifier 40 and the observer 60 does not participate in further messaging between the notifier 40 and the observer 60. With reference to FIG. 5, the notifier 40, now pointed directly to the observer 60, awaits the happening of the predetermined triggering event 403, i.e. the presence of an incoming call on the line "L" being monitored by notifier 40. When the notifier 40 detects the event 403, the notifier 40 sends a message 401 to the observer 40 for processing thereof, for example, to play a prerecorded message and record an incoming message when an incoming telephone call is routed to voicemail.

Figure 6:
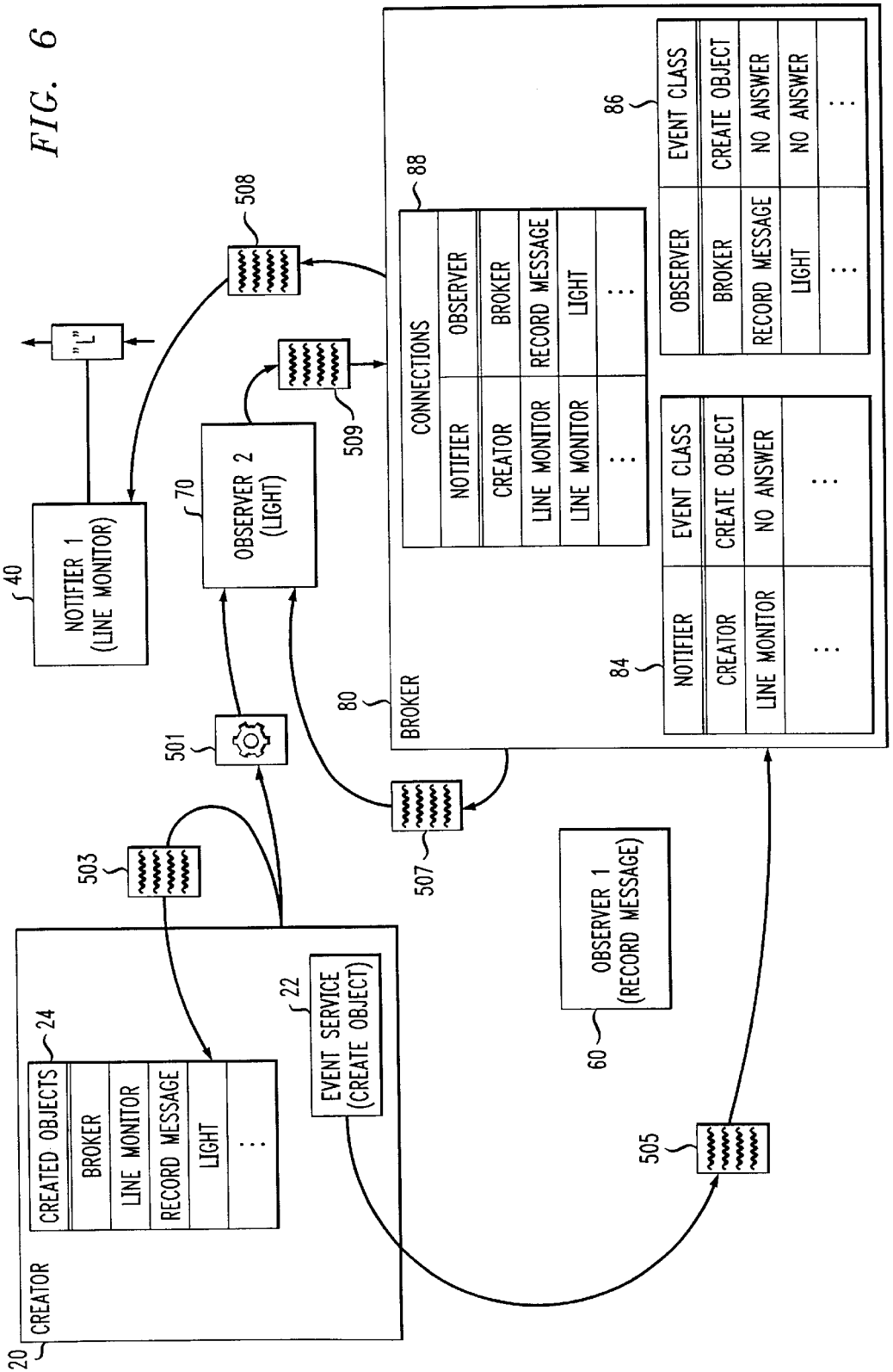
FIG. 6 is a diagrammatic view of the system for exchanging information between software components of FIG. 1, showing a further step of creating an additional observer.

With reference to FIG. 6, additional objects are created in the system 10 which are automatically integrated into the callback relationships previously brokered between notifiers and observers existing in the system 10 as previously described. For example, creator 20 creates a new observer 70 labeled "Light" as illustrated by the block 501, which, like the "Record Message" observer 60, is interested in being notified when an incoming call is present on the line "L", for example, to light a "Call Waiting" light on the called user's telephone. Upon creation of the new observer 70, the creation service 22 sends a message 503 to the created objects registry 24 to add the new observer 70 thereto and sends a message 505 to the broker 80, informing the broker 80 of the creation of a new object and pointing the broker 80 to the location of the newly-created new observer 70. The broker 80 next sends a message 507 to the newly-created object, i.e., the new observer 70, to determine if the new object offers notification services. Finding that it does not, as in the present example, the broker takes no further action with respect to the new observer 70.

When the new observer 70 becomes interested in receiving notification of the occurrence of a predetermined triggering event having a given event class, the new observer 70 locates the broker 80 and sends a message 509 to the broker 80, subscribing to the notification service having the given event class. This is accomplished simply by the broker 80 adding the new observer 70 to the observers look-up table 86, along with the new observer's 70 event class, which the new observer 70 discloses to the broker 80 in message 509. As illustrated, the new observer 70 is interested in being informed when an incoming call is received on the line "L" so that the "Call Waiting" light can be illuminated on the called user's telephone. The new observer 70, then, desires to subscribe to notification services having a "no answer" event class. This information is added to the observers look-up table 86.

The broker 80 then scans the notifiers look-up table 84 to determine if any notifiers previously created and listed therein include a matching "no answer" event class. Finding the notifier 40 listed therein having a "no answer" event class, the broker 80 adds the notifier 40-new observer 70 connection to the connections look-up table 88 and records the location of the new observer 70. The broker 80, knowing the location of the notifier 40 as provided by the creator 20, sends a message 508 to the notifier 40, instructing the notifier 40 to send notification of the occurrence of the triggering event directly to the new observer 70 at the new observer's 70 known location. The broker 80, has thereby established a direct callback relationship between the notifier 40 and the new observer 70 without either component having to search for the other, and without disrupting the existing callback relationship between the notifier 40 and the existing "Record Message" observer 60. The broker 80, having thus established the callback relationship between the notifier 40 and the new observer 70 does not participate in further messaging therebetween.

With additional reference to FIG. 7, the notifier 40, now pointed directly to both the observer 60 and the new observer 70, awaits the occurrence of the predetermined triggering event 403, e.g., an incoming call received on line "L". When the notifier 40 detects that an incoming call is present on the line "L", the notifier 40 sends a message 401 to the observer 60 for processing, for example, to play a prerecorded message and record an incoming message for a voicemail application, and also sends a message 505 to the new observer 70 for processing, for example, to activate a light on the called user's telephone.

Because observers do not negotiate the callback interfaces directly with notifiers, a notifier may be removed from the system, for example due to failure or modification of the notifier, and later be re-created without the observer's knowledge. Whereas in the past an observer had to directly contact and negotiate a callback interface with one or more notifiers to receive messages from the notifiers, in accordance with the present invention, no such direct negotiations need to be performed since contacts between notifiers and observers are set up by and through the broker 80. One advantage of this aspect of the present invention is that it allows so-called "hot swapping" of software components, in the illustrated embodiment notifiers and observers of a telecommunications system, since these components never need to address each other directly to negotiate callback interfaces but rather only need to inform the broker 80 of their existence. If a notifier is removed from the system 10, for example due to the notifier's failure, it will cease to monitor for the occurrence of the triggering event associated with it, and will therefore cease to send messages to the observer or observers. Although the observer or observers now wait for notification messages which will never arrive, re-creation of the notifier does not require the observer or observers to negotiate a callback interface with the notifier. Instead, as the new notifier is created, its event class is entered in the look-up tables 84, 86, 88 of the broker 80 and the connection to the observer is dynamically re-created by the broker 80 as previously described, however, without the observer's knowledge. The broker 80 simply sends a message to the re-created notifier, instructing the notifier to send notification messages to the appropriate observers. The system 10 thus provides automatic recovery from a notifier's failure or removal from service and eliminates the recovered notifier's negotiation of callback interfaces with all appropriate observers.

It follows, then, that notifiers may be intentionally removed from the system 10, in which case, the notifier 40 sends a message to the broker 80, instructing the broker 80 to remove the notifier from the look-up tables 84, 86, 88. Re-creation of the notifier reestablishes callback interfaces with all interested observers as described above. Preferably, failing notifiers would also cause the creator to preform such a purging operation in all but the most catastrophic and unpredictable failures. Similarly, observers should advise the broker 80 when they are being removed, either intentionally or due to a continuing deterioration which leads to failure.

Observers may also be intentionally removed from the system 10, in which case, the observer 60 (or the creator using a "de-creation" service) sends a message to the broker 80, instructing the broker 80 to remove the observer from the look-up tables 84, 86, 88. The broker 80, upon scanning the look-up tables 84, 86, 88 to determine if the removed observer forms a connection with any notifier, then sends a message to the appropriate notifiers, instructing the notifiers to cease sending notification messages to the removed observer. In this manner, observers unsubscribe to notification services previously subscribed-to. Re-creation of the observer updates the look-up tables 84, 86, 88, thereby pointing the corresponding notifiers to the new location of the re-created observer. Notifiers may be adapted to query the state of the observers, whereby all triggering events not previously received by the observer would be sent to it upon its recreation. Unintentional removal of an observer from the system 10, such as due to failure of the observer, is corrected upon re-creation of the observer, at which time, the look-up tables are updated and all corresponding notifiers are re-directed to the new location of the re-created observer. In addition, newly created observers are advised of all events up to their time of creation so that they are aware of the current status of the system 10. Thus, the system 10 provides dynamic recovery and "hot swapping" capability of software components and automatic recovery of connection interfaces whenever components are removed and reinstalled in the system 10.

The broker 80 may also be provided with an audit function, whereby the broker 80 periodically queries each notifier and each observer to determine whether its location is correctly listed in the look-up tables 84, 86, 88. In the event that the broker 80 determines that a component listed in the look-up tables 84, 86, 88 no longer exists in the listed location, the broker 80 automatically removes the component from the corresponding look-up tables and instructs any components related to the extinct component accordingly. For example, if the broker 80 determines upon query that an observer has been removed from its location without advising the broker 80 to this effect, the broker 80 removes any reference to the observer from the look-up tables 84, 86, 88 and sends a message to any notifier to which a connection with the observer had been listed in the connections look-up table 88 to cease transmitting messages to the removed observer.

The foregoing description has referred generally to components sending messages directly to/from one another, using conventional memory addressing techniques. It will be obvious to those skilled in the art that this may be accomplished using any conventional component-based platform, such as COM, DCOM, CORBA or the like, which uses so-called connection points to establish a callback interface between a notifier and an observer. For a connection point based platform, the broker 80 may be referred to as a connection point manager.

Although the present invention has been described in terms of specific embodiments which are set forth in detail, it should be understood that this is by illustration only and that the present invention is not limited thereto, since alternative embodiments not described in detail herein will be apparent to those skilled in the art in view of the above description, the attached drawings and the appended claims. Accordingly, modifications are contemplated which can be made without departing from either the spirit or the scope of the present invention.

We claim:

1. A system for exchanging information between software modules of an object-oriented software program, said system comprising:

a broker comprising a first look-up table for registering software modules including notifiers, which notify other modules of the occurrence of one or more triggering events having corresponding event classes, and a second look-up table for registering software modules including observers, which are to receive notification of one or more triggering events having corresponding event classes;

a first notifier created by the object-oriented software program and adapted to detect the occurrence of a first predetermined triggering event having a first event class; and a first observer created by the object-oriented software program interested in receiving notification of the occurrence of predetermined triggering events having a second event class wherein, said broker adding said first notifier to said first look-up table when said first notifier is created by the object-oriented software program, said broker adding said first observer to said second look-up table when said first observer sends a subscribe message to said broker; and said broker is adapted to compare said first look-up table with said second lookup table such that, upon said broker's detecting that said first event class and said second event class are the same, said broker instructs said first notifier to notify said first observer directly of the occurrence of said first predetermined triggering event.

2. The system for exchanging information between software modules as claimed in claim 1 wherein said first notifier, said first observer and said broker each reside in discrete addressable locations of a computer's memory.

3. The system for exchanging information between software modules as claimed in claim 2 wherein said first notifier, said first observer and said broker each reside on one or more computers.

4. The system for exchanging information between software modules as claimed in claim 1 further comprising a second observer created by said object-oriented software program interested in receiving notification of the occurrence of predetermined triggering events having a third event class wherein said broker adds said second observer to said second look-up table when said second observer sends a subscribe message to said broker and wherein said broker instructs said first notifier to notify said second observer directly of the occurrence of said first predetermined event when said broker detects that said first event class and said third event class are the same.

5. The system for exchanging information between software modules as claimed in claim 4 wherein said second observer is further interested in receiving notification of the occurrence of predetermined triggering events having a fifth event class and is so registered in said second look-up table and further comprising a second notifier, said second notifier adapted to detect the occurrence of a second predetermined triggering event having a fourth event class, said broker adding said second notifier to said first look-up table when said second notifier is created, said broker instructing said second notifier to notify said second observer directly of the occurrence of said second predetermined triggering event when said broker detects that said fourth event class and said fifth event class are the same.

6. The system for exchanging information between software modules as claimed in claim 1 further comprising a second notifier created by the object-oriented software program and adapted to detect the occurrence of a second predetermined triggering event having a third event class, said broker adding said second notifier to said first look-up table when said second notifier is created, said broker instructing said second notifier to notify said first observer directly of the occurrence of said second predetermined triggering event when said broker detects that said second event class and said third event class are the same.

7. The system for exchanging information between software modules as claimed in claim 6 wherein said second notifier is further adapted to detect the occurrence of a third predetermined triggering event having a fourth event class and being so registered in said first look-up table and further comprising a second observer interested in receiving notification of the occurrence of predetermined triggering events having a third event class wherein said broker adds said second observer to said second look-up table when said second observer sends a subscribe message to said broker and wherein said broker instructs said second notifier to notify said second observer directly of the occurrence of said third predetermined event when said broker detects that said fourth event class and said third event class are the same.

8. A system for exchanging information between software modules, said system comprising:

a broker comprising a first look-up table for registering modules, notifiers, which notify other modules of the occurrence of one or more triggering events having corresponding event classes and a second look-up table for registering modules, observers, which are to receive notification of one or more triggering events having corresponding event classes:

a first notifier adapted to detect the occurrence of a first predetermined triggering event having a first event class; and a first observer interested in receiving notification of the occurrence of predetermined triggering events having a second event class wherein, said broker adding said first notifier to said first look-up table when said first notifier is created, said broker adding said first observer to said second look-up table when said first observer sends a subscribe message to said broker; and said broker is adapted to compare said first look-up table with said second lookup table such that, upon said broker's detecting that said first event class and said second event class are the same, said broker instructs said first notifier to notify said first observer directly of the occurrence of said first predetermined triggering event, wherein said broker further comprises a third look-up table for registering notifier-observer connections thereon, one of said notifier-observer connections being added to said third look-up table when said first event class and said second event class are the same.

9. A system for exchanging information between software modules, said system comprising:

a broker comprising a first look-up table for registering modules, notifiers, which notify other modules of the occurrence of one or more triggering events having corresponding event classes and a second look-up table for registering modules, observers, which are to receive notification of one or more triggering events having corresponding event classes;

a first notifier adapted to detect the occurrence of a first predetermined triggering event having a first event class; and a first observer interested in receiving notification of the occurrence of predetermined triggering events having a second event class; and a creator adapted to create software modules and wherein said broker adds said creator to said first look-up table when said broker is created, said broker adding said first notifier to said first look-up table when said first notifier is created, said broker adding said first observer to said second look-up table when said first observer sends a subscribe message to said broker; and said broker is adapted to compare said first look-up table with said second look-up table such that, upon said broker's detecting that said first event class and said second event class are the same, said broker instructs said first notifier to notify said first observer directly of the occurrence of said first predetermined triggering event.

10. A system for exchanging information between software modules, said system comprising:

a broker comprising a first look-up table for registering modules, notifiers, which notify other modules of the occurrence of one or more triggering events having corresponding event classes and a second look-up table for registering modules, observers, which are to receive notification of one or more triggering events having corresponding event classes;

a first notifier adapted to detect the occurrence of a first predetermined triggering event having a first event class; and a first observer interested in receiving notification of the occurrence of predetermined triggering events having a second event class wherein, said broker adding said first notifier to said first look-un table when said first notifier is created, said broker adding said first observer to said second look-up table when said first observer sends a subscribe message to said broker; and said broker is adapted to compare said first look-up table with said second lookup table such that, upon said broker's detecting that said first event class and said second event class are the same, said broker instructs said first notifier to notify said first observer directly of the occurrence of said first predetermined triggering event, wherein said broker adds said broker to said second look-up table when said broker is created.

11. A method for exchanging information between software modules of an object-oriented software program, comprising the steps of:

creating, by the object-oriented software program, a broker including a first look-up table and a second look-up table;

creating, by the object-oriented software program, a first notifier adapted to detect the occurrence of a first predetermined triggering event having a first event class;

said broker listing said first notifier with said first event class in said first look-up table upon creation of said first notifier;

creating, by the object-oriented software program, a first observer interested in receiving notification of the occurrence of predetermined triggering events having a second event class;

said broker listing said first observer with said second event class in said second look-up table when said first observer subscribes to said broker;

said broker comparing said first look-up table with said second look-up table; and, said broker instructing said first notifier to notify said first observer directly of the occurrence of said first predetermined triggering event if said first event class and second event class are the same.

12. The method for exchanging information between software modules as claimed in claim 11 further comprising the steps of:

said first notifier detecting the occurrence of said first predetermined triggering event; and, said first notifier notifying said first observer of the occurrence of said first predetermined triggering event, said first event class and said second event class being the same.

13. The method for exchanging information between software modules as claimed in claim 11 further comprising the step of: said broker adding a notifier-observer connection to a third look-up table when said first event class and said second event class are the same.

14. The method for exchanging information between software modules as claimed in claim 11 further comprising the steps of:

creating, by the object-oriented software program, a second observer interested in receiving notification of the occurrence of predetermined triggering events having a third event class;

said broker listing said second observer with said third event class in said second look-up table when said second observer subscribes to said broker;

said broker comparing said first look-up table with said second look-up table; and, said broker instructing said first notifier to notify said second observer directly of the occurrence of said first predetermined triggering event if said first event class and said third event class are the same.

15. The method for exchanging information between software modules as claimed in claim 14 further comprising the steps of:

said broker creating a second notifier adapted to detect the occurrence of a second predetermined triggering event having a fourth event class;

said broker listing said second notifier with said fourth event class in said first look-up table upon creation of said second notifier;

said broker comparing said first look-up table with said second look-up table; and, said broker instructing said second notifier to notify said second observer directly of the occurrence of said second predetermined triggering event if said third event class and said fourth event class are the same.

16. The method for exchanging information between software modules as claimed in claim 11 further comprising the steps of:

creating, by the object-oriented software program, a second notifier adapted to detect the occurrence of a second predetermined triggering event having a third event class;

said broker listing said second notifier with said third event class in said first look-up table upon creation of said second notifier;

said broker comparing said first look-up table with said second look-up table; and, said broker instructing said second notifier to notify said first observer directly of the occurrence of said second predetermined triggering event if said second event class and said third event class are the same.

17. A method for exchanging information between software modules, comprising the steps of:

creating a broker including a first look-up table and a second look-up table;

creating a first notifier adapted to detect the occurrence of a first predetermined triggering event having a first event class;

said broker listing said first notifier with said first event class in said first look-up table upon creation of said first notifier;

creating a first observer interested in receiving notification of the occurrence of predetermined triggering events having a second event class;

said broker listing said first observer with said second event class in said second look-up table when said first observer subscribes to said broker;

said broker comparing said first look-up table with said second look-up table;

said broker instructing said first notifier to notify said first observer directly of the occurrence of said first predetermined triggering event if said first event class and second event class are the same; and said broker adding said broker to said second look-up table when said broker is created.

18. A method for exchanging information between software modules, comprising the steps of:

creating a broker including a first look-up table and a second look-up table;

creating a first notifier adapted to detect the occurrence of a first predetermined triggering event having a first event class;

said broker listing said first notifier with said first event class in said first look-up table upon creation of said first notifier;

creating a first observer interested in receiving notification of the occurrence of predetermined triggering events having a second event class;

said broker listing said first observer with said second event class in said second look-up table when said first observer subscribes to said broker;

said broker comparing said first look-up table with said second look-up table;

said broker instructing said first notifier to notify said first observer directly of the occurrence of said first predetermined triggering event if said first event class and second event class are the same; and providing a creator adapted to create software modules; and said broker adding said creator to said first look-up table when said broker is created.

19. The method for exchanging information between software modules as claimed in claim 18 further comprising the steps of:

said creator adding said first notifier to a registry after said step of creating said first notifier; and, said creator adding said first observer to said registry after said step of creating said first observer.

20. A method for exchanging information between software modules, comprising the steps of:

creating a broker including a first look-up table and a second look-up table;

creating a first notifier adapted to detect the occurrence of a first predetermined triggering event having a first event class;

said broker listing said first notifier with said first event class in said first look-up table upon creation of said first notifier;

creating a first observer interested in receiving notification of the occurrence of predetermined triggering events having a second event class;

said broker listing said first observer with said second event class in said second look-up table when said first observer subscribes to said broker;

said broker comparing said first look-up table with said second look-up table;

said broker instructing said first notifier to notify said first observer directly of the occurrence of said first predetermined triggering event if said first event class and second event class are the same; and said broker querying each notifier listed in said first look-up table to determine if each notifier is in service;

said broker removing each notifier from said first look-up table which is not in service; and said broker noting all observers of each notifier which is removed from said first look-up table.

21. The method for exchanging information between software modules as claimed in claim 20 further comprising the step of said broker informing said all observers of each notifier that is removed from said first list that said each notifier is not in service.

22. A method for exchanging information between software modules the steps of, comprising the steps of:

creating a broker including a first look-up table and a second look-up table;

creating a first notifier adapted to detect the occurrence of a first predetermined triggering event having a first event class;

said broker listing said first notifier with said first event class in said first look-up table upon creation of said first notifier;

creating a first observer interested in receiving notification of the occurrence of predetermined triggering events having a second event class;

said broker listing said first observer with said second event class in said second look-up table when said first observer subscribes to said broker;

said broker comparing said first look-up table with said second look-up table;

said broker instructing said first notifier to notify said first observer directly of the occurrence of said first predetermined triggering event if said first event class and second event class are the same;

said broker querying each observer listed in said second look-up table to determine if each observer is in service;

said broker removing each observer from said second look-up table which is not in service; and said broker noting all notifiers of each observer which is removed from said second look-up table.

23. The method for exchanging information between software modules as claimed in claim 22 further comprising the step of said broker instructing all notifiers of each observer which is removed from said second look-up table to cease notifying each said observer.

24. A method for exchanging information between software modules, comprising the steps of:
- creating a broker including a first look-up table and a second look-up table;
- creating a first notifier adapted to detect the occurrence of a first predetermined triggering event having a first event class;
- said broker listing said first notifier with said first event class in said first look-up table upon creation of said first notifier;
- creating a first observer interested in receiving notification of the occurrence of predetermined triggering events having a second event class;
- said broker listing said first observer with said second event class in said second look-up table when said first observer subscribes to said broker;
- said broker comparing said first look-up table with said second look-up table;
- said broker instructing said first notifier to notify said first observer directly of the occurrence of said first predetermined triggering event if said first event class and second event class are the same;
- removing said first notifier from said first look-up table;
- said broker comparing said first look-up table with said second look-up table; and
- said broker informing said first observer that said first notifier is not in service if said first event class and said second event class are the same.

25. A method for exchanging information between software modules, comprising the steps of:
- creating a broker including a first look-up table and a second look-up table;
- creating a first notifier adapted to detect the occurrence of a first predetermined triggering event having a first event class;
- said broker listing said first notifier with said first event class in said first look-up table upon creation of said first notifier;
- creating a first observer interested in receiving notification of the occurrence of predetermined triggering events having a second event class;
- said broker listing said first observer with said second event class in said second look-up table when said first observer subscribes to said broker;
- said broker comparing said first look-up table with said second look-up table;
- said broker instructing said first notifier to notify said first observer directly of the occurrence of said first predetermined triggering event if said first event class and second event class are the same;
- removing said first observer from said second look-up table;
- said broker comparing said first look-up table with said second look-up table; and,
- said broker instructing said first notifier to cease notifying said first observer of the occurrence of said first predetermined triggering event if said first event class and said second event class are the same.

* * * * *